(12) United States Patent
Brombach

(10) Patent No.: US 11,754,042 B2
(45) Date of Patent: Sep. 12, 2023

(54) METHOD FOR CONTROLLING A WIND POWER INSTALLATION OR A WIND FARM

(71) Applicant: Wobben Properties GmbH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 240 days.

(21) Appl. No.: 17/108,849

(22) Filed: Dec. 1, 2020

(65) Prior Publication Data

US 2021/0172420 A1 Jun. 10, 2021

(30) Foreign Application Priority Data

Dec. 5, 2019 (DE) .......................... 102019133208.7

(51) Int. Cl.
| | | |
|---|---|---|
| H02J 3/46 | (2006.01) | |
| G06Q 50/06 | (2012.01) | |
| H02J 3/18 | (2006.01) | |
| H02J 3/38 | (2006.01) | |
| F03D 7/02 | (2006.01) | |
| F03D 9/25 | (2016.01) | |
| H02J 3/00 | (2006.01) | |
| H02J 13/00 | (2006.01) | |

(52) U.S. Cl.
CPC .......... *F03D 7/0284* (2013.01); *F03D 9/257* (2017.02); *G06Q 50/06* (2013.01); *H02J 3/003* (2020.01); *H02J 3/1814* (2013.01); *H02J 3/381* (2013.01); *H02J 3/466* (2020.01); *H02J 13/00001* (2020.01); *G05B 2219/2203* (2013.01); *G05B 2219/2619* (2013.01); *H02J 2300/28* (2020.01)

(58) Field of Classification Search
CPC ...... F03D 7/0264; F03D 7/028; F03D 7/0284; F03D 7/048; F03D 9/257; F05B 2260/96; G05B 2219/2203; G05B 2219/2619; G06Q 50/06; Y02E 10/72; Y02E 10/76; H02J 13/00001; H02J 2300/28; H02J 3/003; H02J 3/1814; H02J 3/381; H02J 3/466

See application file for complete search history.

(56) References Cited

U.S. PATENT DOCUMENTS

2009/0281675 A1* 11/2009 Rasmussen ............. F03D 17/00
290/44
2013/0272844 A1* 10/2013 Lobato Pena ........... F03D 7/048
415/10

(Continued)

FOREIGN PATENT DOCUMENTS

DE 102017112944 A1 12/2018
DE 102018125445 A1 4/2020

(Continued)

*Primary Examiner* — Yuhui R Pan
(74) *Attorney, Agent, or Firm* — Seed IP Law Group LLP

(57) ABSTRACT

A control system of a wind power installation and/or a wind farm is provided. The control system has a plurality of operating modes and has an interface. The interface is configured for providing maximum adjustability of the wind power installation and/or the wind farm in critical power grid situations. The interface is configured to receive a signal of a power grid operator, as a result of which all of the plurality of operating modes are released and made available to the power grid operator.

17 Claims, 3 Drawing Sheets

(56) References Cited

U.S. PATENT DOCUMENTS

| | | | | |
|---|---|---|---|---|
| 2013/0277969 A1* | 10/2013 | Nielsen | .................. | H02J 3/381 |
| | | | | 290/44 |
| 2018/0187650 A1* | 7/2018 | Byreddy | ................. | F03D 7/028 |
| 2019/0211803 A1 | 7/2019 | Brombach et al. | | |
| 2020/0116127 A1 | 4/2020 | Brombach | | |

FOREIGN PATENT DOCUMENTS

| | | | |
|---|---|---|---|
| EP | 2654165 | A1 | 10/2013 |
| WO | 2018/121667 | A1 | 7/2018 |

\* cited by examiner

METHOD FOR CONTROLLING A WIND POWER INSTALLATION OR A WIND FARM

BACKGROUND

Technical Field

The present invention relates to a control system of a wind power installation and/or of a wind farm and to a method for controlling such a wind power installation and/or such a wind farm. In particular, the present invention relates to such a wind power installation and to such a wind farm.

Description of the Related Art

Wind farms and the wind power installations which are integrated in a wind farm frequently have technical properties which are blocked on the software side by, for example, the operating software of the wind power installation.

An example of this is what is referred to as noise-reduction operation (referred for short as noise reduction) in which the wind power installation is operated at a rotation speed which is set so as to optimize noise and not performance. This means, in particular, that the wind power installation is operated at a rotational speed at which the wind power installation has a low noise level, that is to say is locked above a specific rotational speed range.

However, in the event of critical power grid situations, that is to say in situations in which the stability of the electricity supply grid is at risk, wind power installations which are operated in such a way cannot contribute, or can only contribute inadequately, to stabilizing the electricity supply grid or when the night operation mode of the wind power installation starts in the evening at 10 pm.

This leads to a situation in which in power grid sections of the electricity supply grid in which a proportionally particularly high number of wind power installations are arranged the power grid operator can only react in a limited way to the critical power grid situation.

BRIEF SUMMARY

A control system or a method are provided making it possible for the power grid operator to access a wind power installation at any time and to the full extent, in particular in order to support or stabilize the electricity supply grid. In particular, the power grid operator is to be provided with maximum adjustability of wind power installations in critical power grid situations.

A control system of a wind power installation and/or of a wind farm is proposed, wherein the control system comprises a plurality of operating modes and has an interface, in particular for providing maximum adjustability of the wind power installation and/or of the wind farm in critical power grid situations, wherein the interface is configured to receive a signal of a power grid operator, as a result of which all of the plurality of operating modes are released and made available to the power grid operator.

The control system can be for example the control unit (controller) of a wind power installation and/or of a wind farm or be implemented in the control unit of the wind power installation and/or of the wind farm.

The control system is preferably the wind farm control unit (controller) of a wind farm.

In addition, the control system has a plurality of operating modes, for example, can be selected automatically using software or by the installation manufacturer by means of an interface.

An operating mode is, for example, the noise-reduction operating mode in which the wind power installation or the wind farm is operated optimized in terms of noise, that is to say in particular in such a way that the noise emissions of the wind power plant or of the wind farm are below legal limiting values.

Further operating modes are for example the night operation mode or the active power operating mode.

The operating modes are preferably implemented using software and/or stored in a database.

In addition, the control system has an interface (receiver, transmitter or transceiver) which is configured to receive a signal of a power grid operator. This can be effected for example by means of radio transmission or cable transmission, for example via the Internet or by means of a signal cable.

The interface itself is also configured in this context to release the maximum adjustability of the wind power installation and/or of the wind farm to the power grid operator. The interface is therefore provided to ensure that the power grid operator receives a full function release of the operating modes of the wind power installation or of the wind farm, in particular in critical power grid situations, that is to say at least whenever the electricity supply grid to which the wind power installation or the wind farm is connected risks becoming destabilized.

Critical power grid situations are therefore to be understood as all those situations in which the electricity supply grid risks becoming destabilized and/or is already destabilized, for example in the event of a black out or a system split. Basically, critical power grid situations occur whenever the power grid frequency differs greatly from the power grid rated frequency, that is to say when for example the power grid frequency is 50.8 Hz and the power grid rated frequency is 50 Hz.

So that the control system can carry out the functions which are described above or below and therefore the interface is configured to carry out the functions which are described above or below, the control system has, in particular, control software which makes it possible for the power grid operator to intervene in the control system via the interface in order in this way to bring about, in particular, the full functional release of the wind power installation or of the wind farm.

Therefore, it is proposed, in particular, that the network operator intervenes actively in the operation of a wind power installation or wind farm via a control system, in particular via an interface, and therefore accesses all the operating modes of the wind power installation.

For example, the wind farm is operated in a noise-reduction operating mode by the wind farm software. In the event of a critical power grid situation, the power grid operator can then connect to the wind farm and select, for example, another operating mode. The power grid operator is therefore enabled, by means of the control system, to control the wind farm in such a way that it assists the power grid when necessary.

The wind power installation or installations of the wind farm has/have an adjustment range which is bounded by a physical adjustment range, that is to say the maximum adjustment range for the active power and the reactive power of the wind power installation, and which is limited, while the wind power installation is operating, by the wind power installation control system and, in particular, by the operating modes.

The power grid operator can access the wind power installation in such a way that for the power grid operator this is limited only then by the physical limits.

The interface or a further interface of the control system is preferably configured to receive a signal from a third party and also or alternatively configured in such a way that the power grid operator is assigned the highest priority within the control system if a signal from the power grid operator has been received by the interface.

The control system can therefore also have further interfaces which have, for example, further functions such as, for example, an interface for the installation manufacturer and/or an interface for the installation operator.

It is particularly advantageous here that various groups can access the wind farm or the wind power installation simultaneously with different authorizations.

However, the control system is also configured in such a way that the power grid operator has the highest priority within the control system, in particular if a signal has been received from the power grid operator via the interface.

The control system is therefore embodied in such a way that the network operator always has the highest priority within the control system, therefore if, for example, the installation operator would like to set a reactive power operating mode and the power grid operator requires the power grid recovery mode, the wind farm or the wind power installation carries out the power grid recovery mode.

The control system preferably comprises a further interface, for example for a wind power installation operator, which is deactivated if a signal has been received from the power grid operator via the interface.

Therefore, insofar as the control system has further interfaces, it is proposed that they are deactivated if the power grid operator would like to access the wind farm or the wind power installation.

Preferably a bit, in particular a breakdown bit, is used for this, said bit being sent to the control system by the power grid operator via the interface.

As soon as the control system has received the breakdown bit, the further interfaces are deactivated, that is to say for example the interface for the operator of the wind farm and/or wind power installation.

The interface or a further interface of the control system is preferably configured to participate at least in one of the following open-loop and/or closed-loop control methods: reactive power control, voltage control, active power control; direct current marketing; minute reserve; secondary reserve; temperature control; Cos-phi control; Q(V) control; shadowing control; bat control.

The interface is therefore configured to receive at least one signal from a third party, which signal ensures that the wind farm or the wind power installation carries out one of these operating modes.

The control system preferably has a database by means of which access of the power grid operator to the wind power installation and/or the wind farm is logged.

It is therefore also proposed that insofar as the power grid operator accesses the wind farm or the wind power installation via the interface of the control system, this is logged at the control system by means of a database, for example the access times, the access period and the operating modes which are requested and triggered by the power grid operator are logged.

Insofar as the operating mode which is requested and triggered by the power grid operator is documented, it is also proposed also to document the operating mode which is actually desired by the operating software.

The control system preferably has at least one safe operating mode which is deactivated and which can be activated by means of the interface, preferably, in particular only, by the power grid operator.

The control system therefore also comprises an operating mode which is deactivated on a standard basis and can be activated by the power grid operator, preferably only by the power grid operator.

The safe operating mode preferably comprises at least one function from the following list: inertia emulation; primary control power; Q(V) control with maximum adjustment range; breakdown control.

There is therefore provision, in particular, that these functions can be activated only by the power grid operator.

In the case of inertia emulation, the wind farm or the wind power installation generates additional electrical power from the inertia of the rotor-generator system of the wind power installation/installations.

In the case of the primary control power, the wind farm or the wind power installation is aimed at bringing about rapid changes in power, in particular that is to say to generate primary control power which the power grid operator can use for the primary control of the electricity supply grid.

In the case of the Q(V) control with a maximum adjustment range, the wind farm or the wind power installation controls the voltage in accordance with the static in the normal mode or else an adapted static in the breakdown mode, wherein adjustment range limitations are ignored for the setting or the adjustment of the voltage. This is particularly advantageous in wind farms which have an adjustment range limitation corresponding to a minimum cos(phi) ("V"). In the lower partial load range, the possible reactive power adjustment range is also very small here. This limitation can be canceled by means of the control system which is described above or below or the method which is described above or below.

Therefore, it is, in particular, also proposed that the power grid operator can cancel the limits of the adjustment range, in particular in order to stabilize the electricity supply grid.

In installations without a STATCOM option but with installed STATCOM hardware, the adjustment range limitation can also be deactivated in the very low partial load range and when the installation is switched off, even if the customer has, for example, not acquired the STATCOM option.

The same also applies to the adjustment of Q setpoint values. It is also attempted to adjust the Q setpoint value to close to the adjustment range limits here.

In the case of breakdown control, a breakdown parameter and/or controller set which differs from the normal mode is activated in the wind farm closed-loop control system and/or wind power installation closed-loop control system. Said normal mode is adapted to the breakdown strategies and can include, for example, the following adaptations:

adapted power frequency static;

adapted voltage reactive power static;

deactivation of a dead band during the voltage and frequency control;

adapted FRT strategy with e.g., a different K factor.

The control system preferably has at least a different operating mode which is activated and which can be deactivated by means of the interface, preferably, in particular only, by the power grid operator.

The control system therefore preferably comprises further operating modes which, in particular, only the power grid operator can deactivate during ongoing operation of the wind farm or of the wind power installation.

The further operating mode preferably comprises at least one function from the following list: noise-reduction operating mode; night operation mode.

The power grid operator is therefore also able to deactivate operating modes which are determined in a staggered fashion and which are prescribed, for example, by legal guidelines, in particular in order to be able to ensure the stability of the electricity supply grid and/or in order to avert danger.

The control system can also comprise further operating modes and/or functions.

The plurality of operating modes preferably comprises at least one mode from the following list: a power grid recovery mode; which can be activated in particular, and is preferably activated, if a signal of the power grid operator has been received via the interface; a STATCOM mode which can be activated in particular, and is preferably activated, if a signal of the power grid operator has been received via the interface; a noise-reduction mode which can be deactivated in particular, and is preferably deactivated, if a signal of the power grid operator has been received via the interface; a bat-detection mode which can be deactivated in particular, and is preferably deactivated, if a signal of the power grid operator has been received via the interface.

The control system is therefore also configured to participate in a power grid recovery and/or to support the electricity supply grid by means of a STATCOM mode.

In addition, the control system can also be used for noise reduction or bats, wherein in these cases the wind farm or the wind power installation is usually operated in a throttled fashion.

A method for controlling a wind power installation and/or a wind farm is also disclosed, comprising the steps: receiving a signal by means of a control system of the wind power installation and/or of the wind farm, determining whether the signal is a signal of a power grid operator which releases and makes available all of a plurality of operating modes of the wind power installation and/or of the windfarm to the power grid operator, releasing the plurality of operating modes of the wind power installation and/or of the windfarm if the signal is a signal of a power grid operator which releases and makes available all of the plurality of operating modes of the wind power installation and/or of the windfarm to the power grid operator.

The method preferably also comprises the step: logging the release of the operating modes for the power grid operator.

The determination as to whether the signal is a signal of a power grid operator which releases and makes available all of a plurality of operating modes of the wind power installation and/or of the wind farm to the network operator is preferably carried out by comparison with signals stored in a database.

The method also preferably comprises the step: control of the wind power installation and/or of the wind farm by the power grid operator.

It is therefore also proposed, in particular, that the power grid operator connects to the wind farm or the wind power installation in critical situations in order to change the operating modes there in such a way that the wind farm or the wind power installation is stabilized by means of the electricity supply grid.

The method which is described above or below is preferably carried out by means of a control system which is described above or below.

A wind power installation is also proposed, comprising a control system which is described above or below and/or a control system which is configured to carry out a method which is described above or below and/or to participate in such a method.

A wind farm is proposed, comprising a wind power installation which is described above or below and also or alternatively a control system which is described above or below and/or a control system which is configured to carry out a method which is described above or below and/or to participate in such a method.

BRIEF DESCRIPTION OF THE SEVERAL VIEWS OF THE DRAWINGS

The present invention will now be explained in more detail below in an exemplary fashion, on the basis of exemplary embodiments and with reference to the accompanying figures, wherein the same reference symbols are used for identical or similar assemblies.

DETAILED DESCRIPTION

Figure 1:
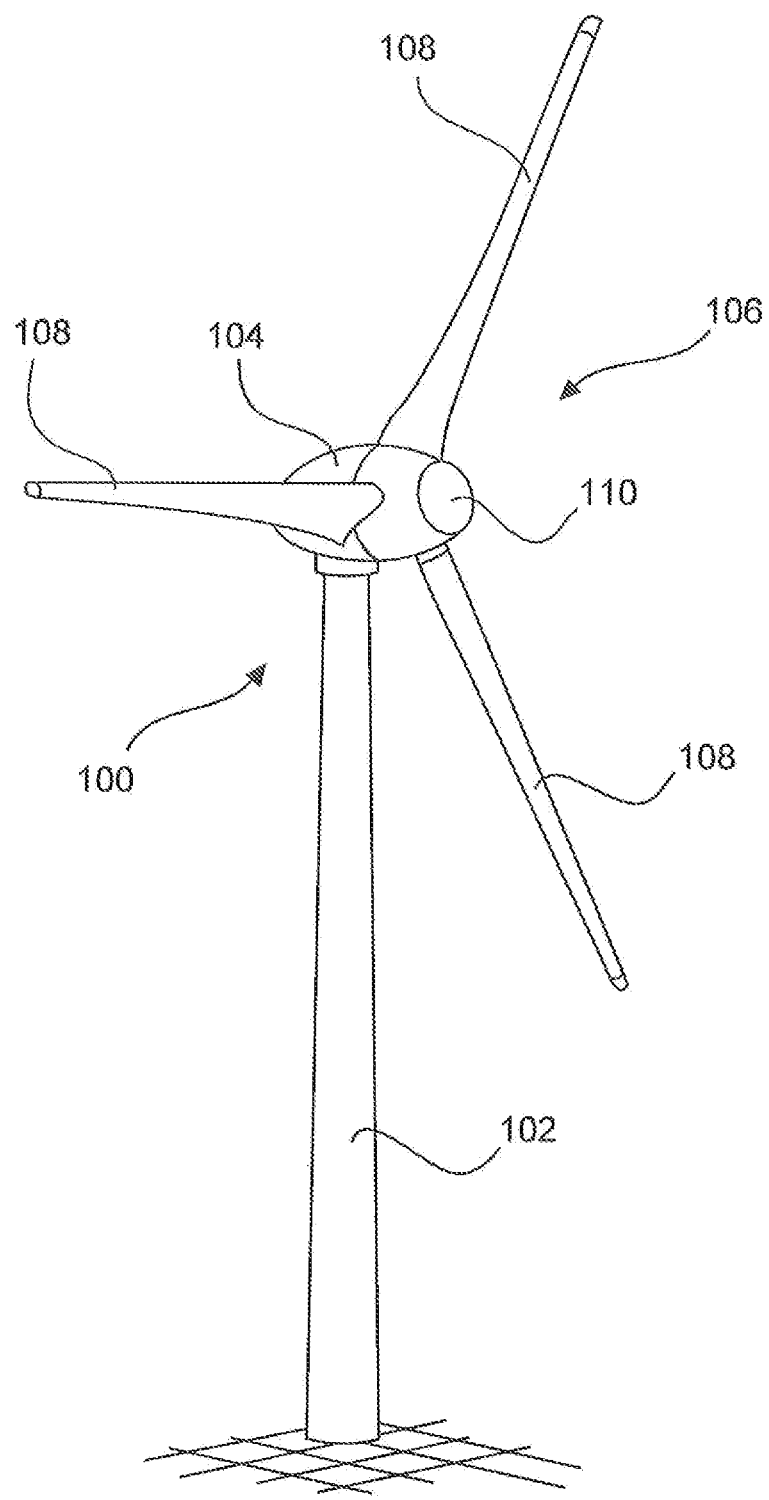
FIG. 1 shows a schematic view of a wind power installation according to one embodiment.

The wind power installation 100 has for this purpose a tower 102 and a nacelle 104. An aerodynamic rotor 106 with three rotor blades 108 and a spinner 110 is arranged on the nacelle 104. The rotor 106 is made to rotate by the wind during operation and as a result drives a generator in the nacelle 104.

In addition, the wind power installation has a control system which is described above or below and is connected to a wind farm control unit and/or to a power grid operator.

Figure 2:
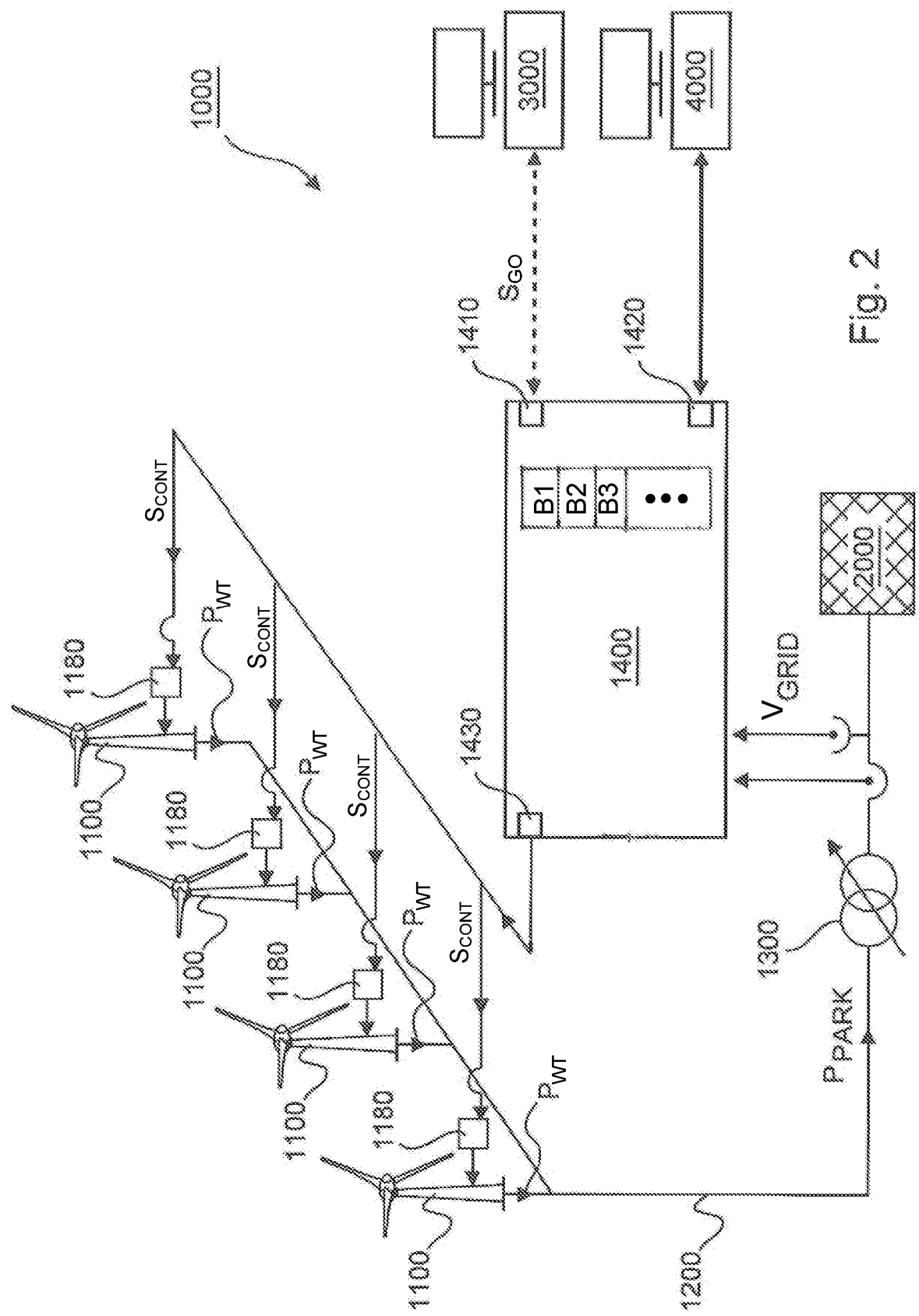
FIG. 2 shows a schematic design of a wind farm with a control system according to one embodiment.

FIG. 2 shows a schematic design of a wind farm 1000 with a control system 1400 according to one embodiment.

The wind farm 1000 comprises a plurality of wind power installations 1100, such as are shown for example in FIG. 1 and which are connected to one another via a common wind farm grid 1200.

The wind farm grid 1200 is connected to an electricity supply grid 2000 by means of a wind farm transformer 1300, in order, for example, to feed electrical wind farm power $P_{park}$ which is composed of a sum of the individual electric wind power installation power levels $P_{WT}$.

In addition, the wind farm 1000 has a control system 1400 according to the disclosure which is embodied as a wind farm control unit, in particular in order to control the wind farm 1000.

The control system 1400 comprises a plurality of operating modes B1, B2, B3 and an interface 1410 and a further interface 1420.

The interface 1410 is configured to receive a signal of a power grid operator 3000, as a result of which all of the plurality of operating modes B1, B2, B3 are released to the power grid operator 3000. This interface 1410 can also be referred to as a power grid operator interface.

As a result, the power grid operator 3000 can access the operating modes B1, B2, B3 of the wind farm 1000 and select them, in particular in such a way that the wind farm 1000 contributes to stabilizing the electricity supply grid 2000.

The further interface 1420 is, for example, an interface for the installation operator 4000, who can also access the wind farm via this interface 1420. This interface 1420 can also be referred to as a wind farm operator interface 1420.

In order to prevent technical control problems, the interface 1410 of the power grid operator has a higher priority within the control system 1400, i.e., the control system 1400 prioritizes the inquiries and specification of the power grid operator over further inquiries or specifications of third parties such as, for example, the installation operator 4000 or the internal control software. This is preferably implemented using control software.

Finally, the actuation of the individual wind power installations 1100 is carried out via a control interface 1430 which is connected to the individual wind power installation control units 1180, for example by means of various control signals $S_{CONT}$.

The control system 1400 is preferably also configured to monitor the feeding by the wind farm 1000 into the electricity supply grid 2000, in particular to monitor the voltage $V_{grid}$ at a grid connecting point of the wind farm.

Figure 3:
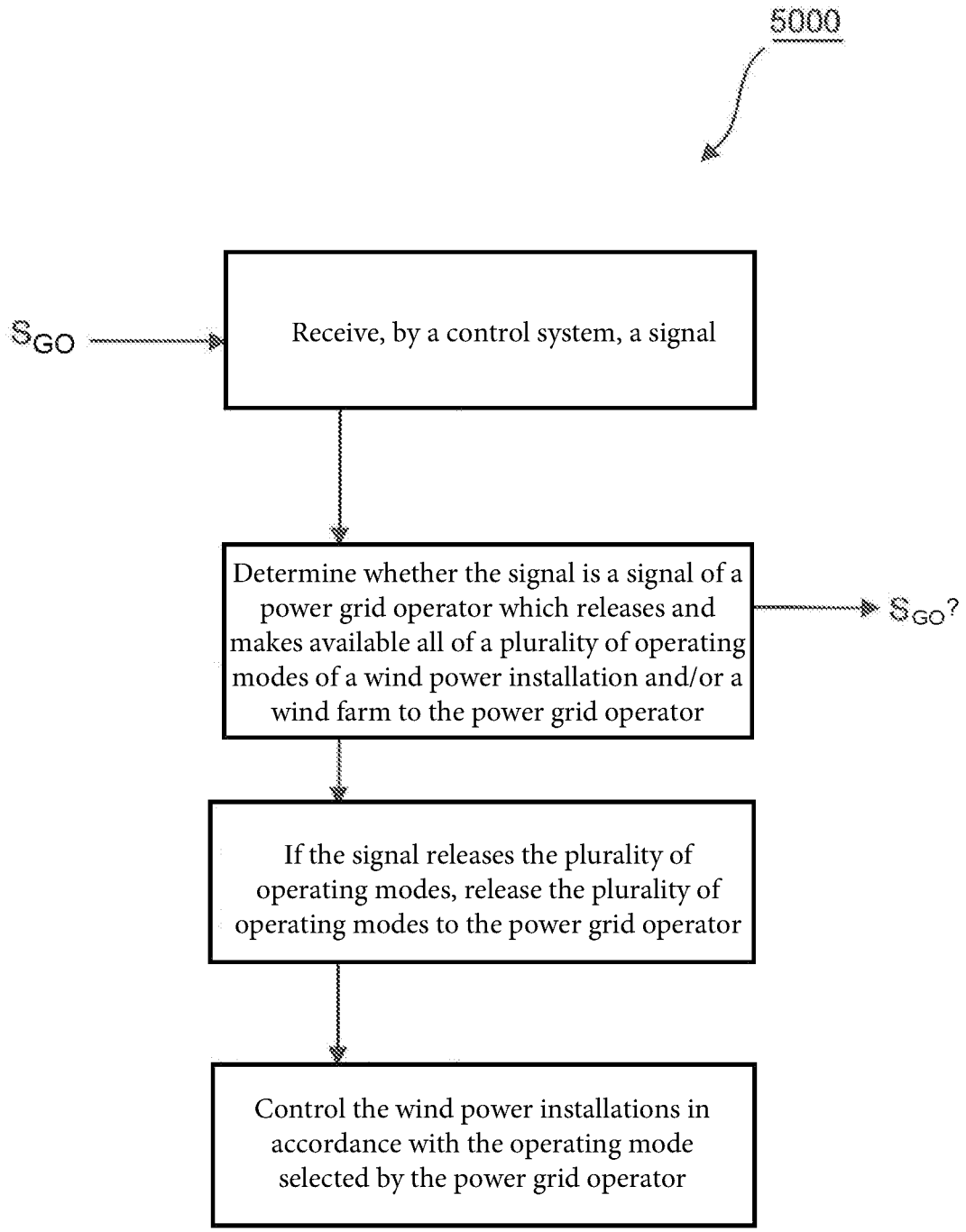
FIG. 3 shows a schematic sequence of a method according to one embodiment.

FIG. 3 shows a schematic sequence of a method according to one embodiment 5000.

In a first step 5100, a signal is received by the control system of the wind power installation and/or of the wind farm.

Then, in a next step 5200 it is determined whether the signal is a signal of a power grid operator which releases and makes available all of a plurality of operating modes of the wind power installation and/or of the wind farm to the power grid operator.

Insofar as the signal is such a signal, in a next step 5300 the plurality of operating modes of the wind power installation and/or of the wind farm is released to the power grid operator.

The power grid operator is then authorized to select corresponding operating modes, such as for example a power grid recovery mode.

The wind power installations of the wind farm are then controlled in a next step 5400 in accordance with the operating mode which is selected by the power grid operator.

It is therefore proposed, in particular, that insofar as a critical power grid situation, such as for example the power grid recovery, occurs, the power grid operator can access the wind farms or wind power installations, in particular immediately. The power grid operator can then deactivate all the limitations within the wind farm or the wind power installations and the wind farms or wind power installations participate with their maximum performance capability in power grid support measures.

For this it is, in particular, also proposed that the power grid operator can deactivate further interfaces and/or other external setpoint values such as, for example, from the installation operator The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control system of a wind power installation or a wind farm, comprising:
    a first interface configured to receive a first signal from a power grid operator,
    wherein:
    the control system has a plurality of operating modes for controlling the wind power installation or the wind farm,
    the control system is configured to enable adjustment of the wind power installation or the wind farm in critical power grid situations, and
    the control system is configured to, in response to receiving the first signal, release all of the plurality of operating modes of the control system and make all of the plurality of operating modes available to the power grid operator.

2. The control system as claimed in claim 1, comprising:
    one or more second interfaces configured to receive a second signal from a third party.

3. The control system as claimed in claim 2, wherein the control system is configured to assign a highest priority to the power grid operator within the control system when the first signal is received from the power grid operator over the first interface.

4. The control system as claimed in claim 2, wherein the third party is a wind power installation operator and the control system is configured to deactivate the one or more second interfaces when the first signal is received from the power grid operator via the first interface.

5. The control system as claimed in claim 2, wherein the one or more second interfaces are configured to enable at least one of the following open-loop and/or closed-loop control methods:
    reactive power control;
    voltage control;
    active power control;
    direct current marketing;
    minute reserve;
    secondary reserve;
    temperature control;
    Cos-phi control;
    Q(V) control;
    shadowing control; and
    bat control.

6. The control system as claimed in claim 1, comprising:
    a database configured to log access of the power grid operator to the wind power installation or the wind farm is logged.

7. The control system as claimed in claim 1, wherein:
    the control system has at least one safe operating mode,
    the at least one safe operating mode is deactivated,
    the at least one safe operating mode is only capable of being activated by the power grid operator and over the first interface.

8. The control system as claimed in claim 7, wherein the safe operating mode includes at least one function from a list of:
    inertia emulation;
    primary control power;
    Q(V) control with maximum adjustment range; and
    breakdown control.

9. A control system of a wind power installation or a wind farm, comprising:
    a first interface configured to receive a first signal from a power grid operator,
    wherein:
    the control system is configured to enable adjustment of the wind power installation or the wind farm in critical power grid situations,
    the control system is configured to, in response to receiving the first signal, release a plurality of operating modes of the control system and make the plurality of operating modes available to the power grid operator, and the control system has at least one operating mode that is activated and is only capable of being deactivated by the power grid operator over the first interface.

10. The control system as claimed in claim 9, wherein the at least one operating mode includes at least one function from a list of:
noise-reduction operating mode; and
night operation mode.

11. The control system as claimed in claim 1, wherein the plurality of operating modes comprises at least one mode from a list of operating modes including:
a power grid recovery mode that is activated in response to receiving the first signal from the power grid operator over the first interface;
a STATCOM mode that is activated in response to receiving the first signal from the power grid operator over the first interface;
a noise-reduction mode that is deactivated in response to receiving the first signal from the power grid operator over the first interface; and
a bat-detection mode that is deactivated in response to receiving the first signal from the power grid operator over the first interface.

12. The control system as claimed claim 1, wherein the control system is a control system of the wind power installation.

13. The control system as claimed claim 1, wherein the control system is a control system of the wind farm.

14. A method for controlling a wind power installation or a wind farm, comprising:

receiving, by a control system of the wind power installation or the wind farm, a first signal;

wherein the control system has a plurality of operating modes for controlling the wind power installation or the wind farm, determining whether the first signal is from a power grid operator and releasing and making available to the power grid operator all of the plurality of operating modes of the wind power installation or the windfarm; and in response to determining that the first signal is from the power grid operator and releasing and making available to the power grid operator all of the plurality of operating modes of the wind power installation or the windfarm, releasing all of the plurality of operating modes of the wind power installation or the windfarm to the power grid operator.

15. The method as claimed in claim 14, comprising:
logging the releasing of the plurality of operating modes to the power grid operator.

16. The method as claimed in claim 14, wherein determining the first signal is from the power grid operator and releases and makes available all of the plurality of operating modes of the wind power installation or the wind farm to the power grid operator includes:
comparing the first signal with signals stored in a database.

17. The method as claimed in claim 14, comprising:
controlling the wind power installation or the wind farm by the power grid operator.

* * * * *